W. GRUN.
FLUID PRESSURE RELAY GOVERNOR.
APPLICATION FILED MAR. 4, 1914. RENEWED SEPT. 7, 1916.

1,204,564.

Patented Nov. 14, 1916.
2 SHEETS—SHEET 1.

Witnesses:

Inventor:

UNITED STATES PATENT OFFICE.

WILLIBALD GRUN, OF FRANKFORT-ON-THE-MAIN, GERMANY.

FLUID-PRESSURE RELAY-GOVERNOR.

1,204,564.  Specification of Letters Patent.  Patented Nov. 14, 1916.

Application filed March 4, 1914, Serial No. 822,473. Renewed September 7, 1916. Serial No. 118,950.

*To all whom it may concern:*

Be it known that I, WILLIBALD GRUN, chief engineer, a subject of the Emperor of Germany, and a resident of Frankfort-on-the-Main, in the Empire of Germany, have invented certain new and useful Improvements in Fluid-Pressure Relay-Governors, of which the following is a specification.

The present invention relates to fluid regulators wherein several regulating valves are employed which are actuated by a pressure medium and by means of a single pilot valve controlled by a governing device. In known regulators of this kind either separate auxiliary valves or changes in the pressure of the said medium are necessary to obtain the desired movements of the regulating valves.

A primary object of the present invention is to actuate in a simple manner several regulating valves which are controlled by a common pilot valve, so that the pilot valve adjusts the regulating valves to the various positions which, in the case of an engine, correspond with the various loads on the latter, in such manner that the said pilot valve, after settling down, returns to the same, or approximately the same, position, in other words, to its middle position. In this manner the entire regulation is practically independent not only of varying pressure of the pressure medium employed but also of accidental or sudden resistance offered to the motion of the regulating valves, because with very small displacements of the pilot valve, the full force to effect adjustment is at once at disposal. To obtain this action, the pressure pistons of the auxiliary machines for driving the regulating valves encounter various resistances to motion. In one preferable embodiment of the invention the pressure pistons are furnished with an inflow and outflow of oil, and each regulating valve retracts the pilot valve through an exactly predetermined distance by means of a compensating device. In that way can be obtained a correct movement of the regulating valves which corresponds to the resistances to motion offered by the resisting elements in the auxiliary machines, and to the loads on the engine plant. Compensation of the common pilot valve by the regulating valves can be effected by means of a connected series of levers, and also partly or wholly by hydraulic means.

To obtain requisite stability of the regulator not only the usual compensating devices may be employed, but also any other devices which bring about a settled or stable condition for the middle position of the pilot valve.

Figure 1:
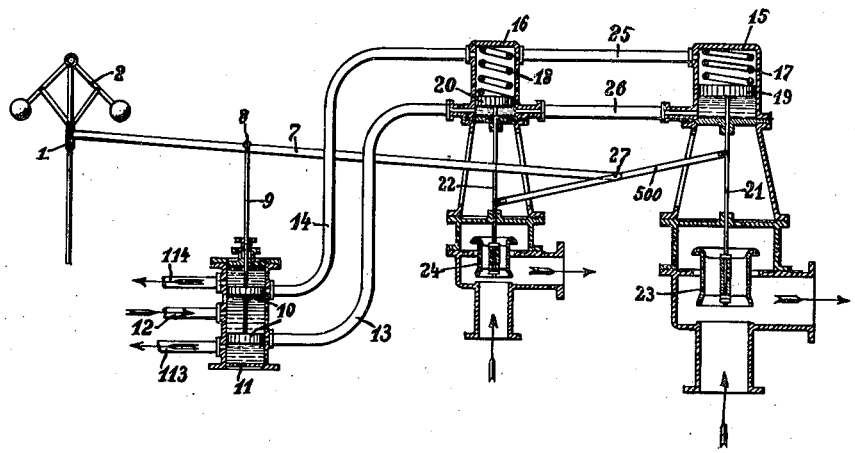
Figure 2:
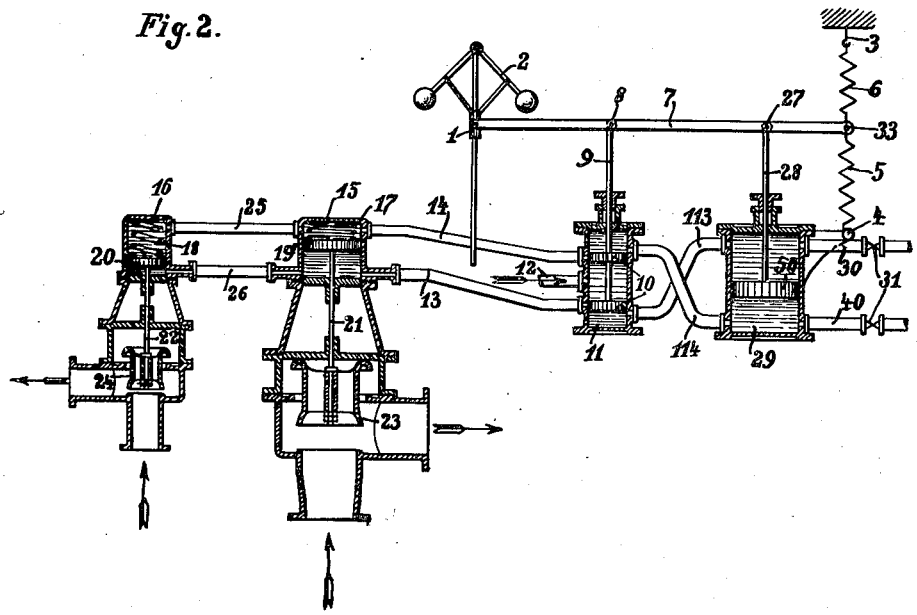
Figure 3:
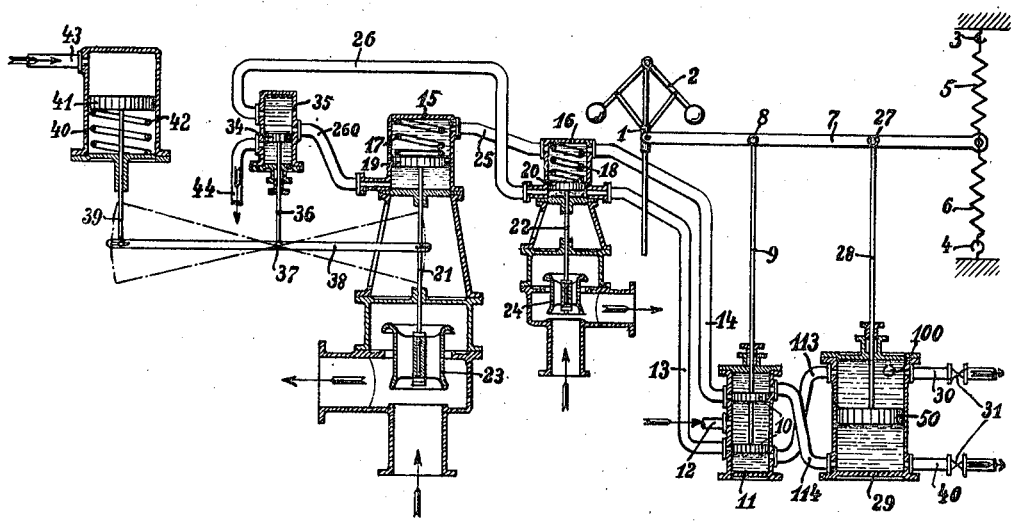
Figure 4:
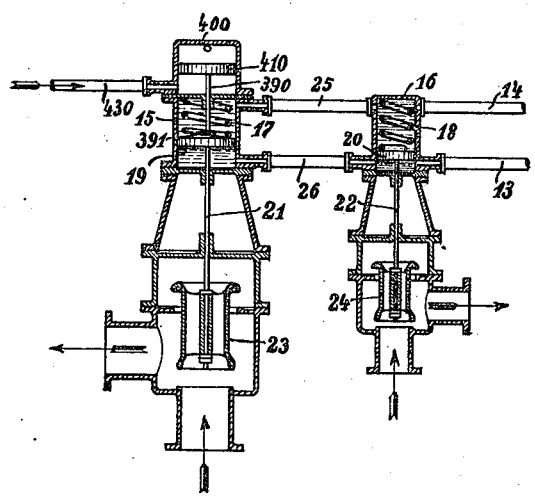

Figure 1 shows partly in side elevation and partly in section a construction of governor mechanism in which the common pilot valve is retracted directly by the motion of the regulating valves. Fig. 2 is a diagrammatic representation of an arrangement in which the common pilot valve is retracted by means of the pressure medium employed for operating the regulating valves. Fig. 3 is a diagrammatic arrangement in which the pilot valve is retracted by means of the pressure medium, and the pressure of the exhaust steam acts directly upon the governor mechanism. Fig. 4 shows a modified construction of the arrangement Fig. 3.

Four embodiments of the present invention are illustrated by way of example in the accompanying drawings.

In all embodiments, the valve-rods 21, 22 of the valves 23, 24, which respectively may represent the exhaust and high pressure steam valves of a steam plant driven by high pressure and exhaust steam, are provided with pistons 19, 20 which are slidable in cylinders 15, 16 and loaded on one side by various strong, helical springs 17, 18. The pressure medium can pass by way of the pipes 13, 14, 25, 26 to the two sides of the pistons 19, 20 according to the position of the pilot valve 10, which is slidable in the valve casing 11 and is pivotally connected to the sleeve 1 of the governor 2 by means of the rod 9, the pin 8, and the rod 7. In the embodiment illustrated in Fig. 1, the rod 7, connected to the governor-sleeve 1 and the pilot valve 10 in the manner stated is pivotally connected by a pin 27 to a link 500, the ends of which are pivotally connected to the rods 21, 22 of the valves 23, 24 so that the movements of the valves 23, 24 retract the pilot valve to its middle position.

Referring to Fig. 1, if, for example, the sleeve 1 of the speed-governor 2 ascends, the pressure medium passes from a suitable source into the pipe 12, and then, owing to the assumed displacement of the pilot valve 10 relatively to the casing 11, into the uncovered entrance to the pipe 14 and thence to the two upper sides of the regulating or pressure pistons 19, 20. Of these pistons the piston 20 will first descend because the stress applied by its helical spring 18 is the greater. The piston 19 may thus remain stationary until the piston 20 reaches its lower limit and the high pressure steam inlet valve 24 is fully closed. Consequently, it is only when the latter valve 24 is closed that the pressure medium can depress the piston 19 of the exhaust steam inlet valve 23. During the motion of the two pistons 19, 20, and the corresponding motion given thereby to the link 500, the common pilot valve is continually retracted toward the middle position. Conversely if the sleeve 1 of the speed governor 2 descends, the pressure medium passes by way of the pipe 13 to the lower sides of the two pistons 19, 20, and, owing to the weaker helical spring 17 loading the piston 19 of the exhaust valve 23, must first raise this piston, so that the high pressure valve 24 will remain unmoved until the piston 19 has reached its upper limit, or the tension on the upper side of the piston 19 has become such that it is approximately equal to the tension on the upper side of the piston 20.

In the embodiment illustrated in Fig. 2 the common pilot valve 10 is retracted by means of the pressure medium employed for operating the regulating valves, which medium, passing through the pipes 113, 114 presses on either side of a piston 50 slidable in the cylinder 29, this piston being, if desired, replaced by a diaphragm, a relief valve or the like. A portion of the pressure medium flowing into the cylinder 29 may flow through ducts 30, 40, provided with throttling devices, while the remaining portion returns to the valve-casing 11 and from there to the source from which the medium is obtained: this discharge of the medium from the casing 11 may, if desired, be controlled by a special valve which is influenced by the speed-governor 2, but which is not shown in the drawing. The retracting or compensating piston 50 is connected, by means of its rods 28 and the pin 27, both to the governor-sleeve 1 and to the helical springs 5, 6 which connect two stationary fastening points 3, 4, so that, owing to the pressure exerted as the result of the varying tensions of the spring 5, 6 when each compensating movement, an isodrome regulation is obtained.

When the governor-sleeve 1 rises or falls the two valves 23, 24 must open and close in their proper order without change in the pressure of the pressure medium being requisite.

The embodiment illustrated in Fig. 3 is substantially the same as that shown in Fig. 2 in respect to the isodrome and hydraulic compensating devices, but in Fig. 3 is shown a regulating device which is specially suitable for the devices according to this invention and the function of which is to change the position of the exhaust valve 23 by means of the pressure of the thermal storage receptacle.

Into the pipe 26, which conveys the pressure medium from the common pilot valve 10 to the lower side of the piston 19 of the exhaust valve 23, is now inserted a cylinder 35, in which slides a piston valve 34 actuated by the pressure of the exhaust steam. The rod 36 of the piston 34 is pivotally connected by means of a pin 37 to a rod 38 which is pivotally connected both to the spindle 21 of the exhaust valve 23 and to the rod 39 of a piston 41 slidable in a cylinder 40, so that the valve 34 is retracted by the movements of the exhaust valve 23. The pressure of the exhaust steam storage receptacle is exerted, owing to the pipe-connection 43, on the upper side of the piston 41, which on its under side is pressed against the pressure of the exhaust steam by a helical spring 42. On the cylinder 35 for the valve 34 is a pipe 44 for discharging the pressure medium from the lower end of the regulating cylinder 15 for the exhaust valve 23, so that the pressure medium can escape from below the piston 19 if the valve 34, owing to a sudden diminution of the exhaust steam pressure, is lifted up to such an extent by the spring 40 that the pipes 260 and 40 are hydraulically connected. The pressure medium discharged from the pipe 44 may return either directly to the source of this medium or thereto through the opening 100 (shown dotted), above the piston 50 of the compensating cylinder 29, if, when the exhaust steam pressure suddenly falls, it is desired suddenly to influence the high pressure steam inlet valve 24 irrespectively of the action of the governor 2. Moreover, when the exhaust steam pressure regulator coacts with the remaining regulating devices in this special manner, a correct movement of the valves 23, 24 according to this invention is readily possible without separate auxiliary valves or the like being necessary; for after the lower side of the piston 19 is closed by the common pilot valve, when the sleeve 1 of the governor 2 rises or falls the pilot valve will be effectively compensated in the same manner as in the case of the embodiments shown in Figs. 1 and 2.

In the embodiment illustrated in Fig. 4, a cylinder 400 is mounted directly on the cylinder 15 for driving the exhaust valve 23, and in the cylinder 400 slides a piston 410 which is acted on on its lower side by the exhaust pressure and on its upper side by the pressure of the ambient air. The rod 390 of this piston has a thickened lower end 391 by means of which it can depress the piston 19 of the exhaust valve 23 and consequently shut off the exhaust steam if the pressure of the latter suddenly falls. Moreover by incorporating the exhaust pressure regulating devices 400, 410 in this manner, no change is made in the proper working of the regulating valves 23, 24. On the other hand the advantage is obtained that owing to the pressure medium which is forced from below the piston 19 to the lower side of the piston 20, the high-pressure steam inlet valve 24 is suddenly raised, and this is desirable when the exhaust steam suddenly fails.

According to the present invention it is of course possible, by means of the common pilot valve 10, to control more than two auxiliary machines for more than two regulating valves, since it needs only suitably varied dimensioning of the resisting or reaction devices of the auxiliary machines to obtain the desired correct movement of the regulating valves.

What I claim as my invention and desire to secure by Letters Patent is:—

1. In regulators for fluids supplied to engines the combination of a plurality of regulating valves for the fluids, a plurality of auxiliary machines comprising valve-actuating elements and resisting elements for opposing the valve opening motion of the former elements, a governor influenced by the engine, means comprising a pilot valve operatively connected to said governor for controlling said valve-actuating elements, and means for returning said pilot valve to substantially the same position for all operative positions of said regulating valves and resisting elements.

2. In regulators for fluids supplied to engines, the combination of a plurality of regulating valves for the fluids, a plurality of auxiliary machines having corresponding parts hydraulically connected in series and comprising valve-actuating elements and resisting elements of various strengths for opposing the valve-opening motion of the former elements, a governor influenced by the engine, means comprising a pilot valve operatively connected to said governor for controlling said valve-actuating elements, and means comprising said auxiliary machines for returning said pilot valve to substantially the same position for all operative positions of said regulating valves and resisting elements.

3. In regulators for fluids supplied to engines, the combination of a plurality of regulating valves for the fluid, a plurality of auxiliary machines comprising valve actuating elements and resisting elements for opposing the valve-opening motion of the former elements, a governor influenced by the engine, means for controlling said valve-actuating elements, said means comprising a pilot valve operatively connected to said governor and hydraulically connected to said auxiliary machines, and means hydraulically connected to said auxiliary machines for returning said pilot valve to substantially the same position for all operative positions of said regulating valves and resisting elements.

4. In regulators for high pressure and exhaust fluids supplied to engines the combination of a plurality of regulating valves for the fluids, said valves comprising an exhaust fluid inlet valve, a plurality of auxiliary machines comprising valve actuating elements and resisting elements for opposing the valve opening motion of the former elements, a governor influenced by the engine, an exhaust fluid pressure regulator adapted to influence said inlet valve, means comprising a pilot valve operatively connected to said governor for controlling said valve-actuating elements and means for returning said pilot valve to substantially the same position for all operative positions of said regulating valves and resisting elements.

5. In regulators for high pressure and exhaust fluids supplied to engines the combination of a plurality of regulating valves for the fluids, said valves comprising an exhaust fluid inlet valve, a plurality of auxiliary machines comprising valve actuating elements and resisting elements for opposing the valve opening motion of the former elements, a governor influenced by the engine, an exhaust fluid pressure regulator adapted to influence said inlet valve, means comprising a pilot valve operatively connected to said governor for controlling said valve-actuating elements and means for returning said pilot valve to substantially the same position for all operative positions of said regulating valves and resisting elements; a stop valve operatively connected to said pressure regulator and adapted to stop the opening actuation of said inlet valve, and means influenced by said inlet valve for retracting said stop-valve after the latter's displacement by said pressure regulator.

6. In regulators for high pressure and exhaust fluids supplied to engines, the combination of a plurality of regulating valves for the fluids, said valves comprising an exhaust fluid inlet valve, a plurality of auxiliary machines comprising valve-actuating elements and resisting elements for opposing the valve-opening motion of the former elements, a governor influenced by the engine, an exhaust fluid pressure regulator adapted to influence said inlet valve only when the exhaust fluid pressure falls below a certain value, means comprising a pilot valve operatively connected to said governor for controlling said valve-actuating elements, and means for returning said pilot valve to substantially the same position for all operative positions of said regulating valves and resisting elements.

7. In regulators for fluids supplied to engines, the combination of a high pressure fluid regulating valve, an exhaust fluid regulating valve, a pair of auxiliary machines comprising valve-actuating elements and resisting elements for opposing the valve-opening motion of the former elements, the corresponding parts of said machines being hydraulically connected, a governor influenced by the engine, means comprising a pilot valve operatively connected to said governor for controlling said valve actuating elements, means for retracting said pilot valve after each displacement by the governor and an exhaust fluid pressure regulator comprising a piston adapted to drive said exhaust fluid regulating valve toward its closing position only when the exhaust fluid pressure falls below a certain value.

In testimony whereof I affix my signature in presence of two witnesses.

WILLIBALD GRUN.

Witnesses:
  FRITZ PAUL,
  BRUNO SONNERSFELD.